UNITED STATES PATENT OFFICE.

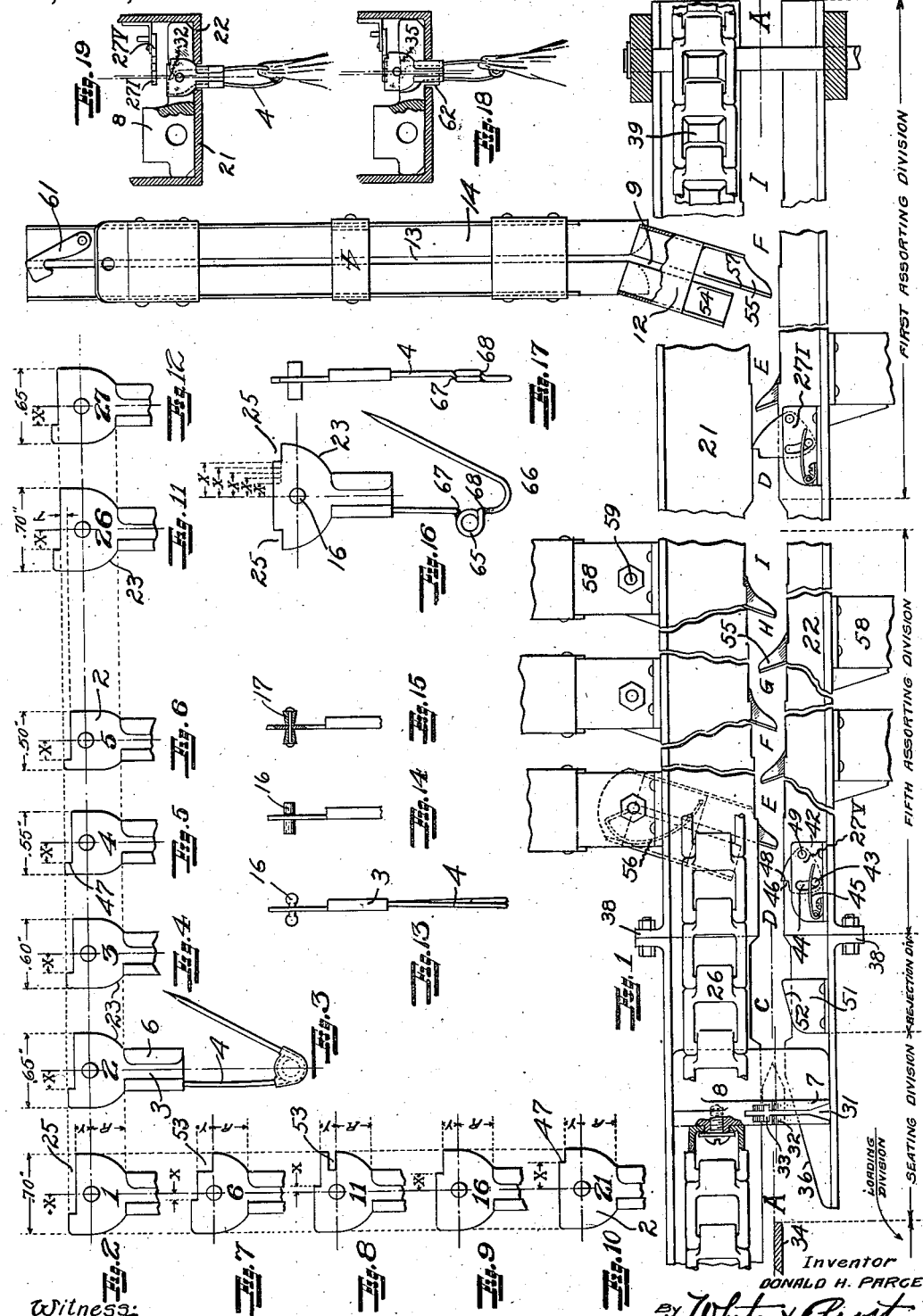

DONALD H. PARCE, OF OAKLAND, CALIFORNIA.

ASSORTING-TAG.

1,217,987.     Specification of Letters Patent.     Patented Mar. 6, 1917.

Application filed May 29, 1916. Serial No. 100,731.

*To all whom it may concern:*

Be it known that I, DONALD H. PARCE, a citizen of the United States, and a resident of Oakland, county of Alameda, State of California, have invented a new and useful Assorting-Tag, of which the following is a specification.

My invention relates to tags for effecting the assorting of articles and especially articles of laundry.

An object of my invention is to provide a tag which may be attached to the articles to be assorted and which in coaction with the mechanism of the assorting apparatus will accomplish the assorting of the articles.

Another object of the invention is to provide a tag which is attachable to the articles to be assorted and by which they are pendently supported in the assorting mechanism.

Another object of the invention is to provide a tag attachable to the articles to be assorted as a means of identifying those articles, and which in coaction with the mechanism of the assorting apparatus will effect the assorting of the articles into lots corresponding to the identification mark.

Another object of the invention is to provide a tag attachable to the articles to be assorted which supports the article in the assorting apparatus and which is distributed through the apparatus at points determined by its shape.

Another object of the invention is to provide a tag attachable to the articles to be assorted which supports the article in the assorting apparatus and which coacts with the mechanism thereof to effect a two-stage assorting, one stage depending on the shape of the tag and the other depending on its size.

Another object of my invention is to provide a tag for use in my assorting apparatus and laundry distributing systems, which are the subjects of my co-pending applications Serial Numbers 100,732 and 847,016 respectively.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form without in the scope of my invention as set forth in the claims.

Referring to the drawings:

Figure 1 is a plan of a part of the assorting apparatus in which my tag is best adapted to be used. The trackway, mechanism for releasing the tag and other correlated parts, are shown.

Figs. 2 and 6 inclusive are views of the five tags comprising the first division of the first series of tags.

Fig. 3 is a view of the complete tag and pin, the pin and a portion of the shank being omitted in Figs. 2, 4, 5 and 6.

Figs. 7 to 10 inclusive are fragmentary views showing the conformation of the tops of the first tags in each of the second, third, fourth and fifth divisions respectively, all of the first series of tags.

Figs. 11 and 12 are fragmentary views showing the conformation of the tops of the first and second tags in the first division of the second series of tags.

Fig. 13 is a side view of the tag showing the preferred form of lug.

Figs. 14 and 15 are fragmentary views of tags with modified forms of lugs.

Fig. 16 is a view of a modified form of tag which is reversible. This figure also shows a modified form of pin.

Fig. 17 is a side view of the tag shown in Fig. 16.

Fig. 18 is a fragmentary sectional view through the track taken in a vertical plane and showing the tag resting in its seat on the carrier.

Fig. 19 is a fragmentary sectional view through the track taken in a vertical plane and showing the tag resting upon the track and in the carrier.

Various modifications of my tag may be used to better adapt it to the different industries in which it will find use, but in the present application, I shall describe the tag as I prefer to make it for use in a laundry assorting apparatus.

In laundries the process of assorting by hand the individual articles is a slow one, it is not always accurate and is apt to be costly. It is one of the objects of my invention to provide a tag which in coaction with the mechanism of a suitable apparatus will accomplish entirely automatically the assorting of these articles rapidly, accurately and at minimum cost.

All articles coming into a laundry to be washed are marked in some way, usually with ink or a label. These methods are objectionable and expensive and in no way further the work of assorting which must be accomplished piece by piece with hand labor. In using my invention a tag is pinned onto each piece or group of small pieces to be washed when the bundle is received. Preferably the tag is numbered and only tags of the same number or description are pinned to pieces in a given lot or bundle. It is seen, therefore, that the tag is an identifying means, taking the place of the ink marking and attached labels, and this function of identifying the article to which it is attached is the first of several functions possessed by the tag.

After the washing process has been completed, the tagged article or group of small articles as for instance, several handkerchiefs together on one tag, are loaded into the conveyer of my assorting apparatus and are then carried out from the loading point and deposited at points determined by the characteristics or conformation of the tag. The loading of the tagged pieces into the conveyer of the apparatus is effected by slipping the tag into a slot in a carrier on the conveyer which travels at a low speed past the loading point. The piece is pendently supported from the tag which alone is held by the carrier. This is the second function performed by the tag, viz., that of supporting or carrying the piece while it is being conveyed from the loading point to the point of discharge from the conveyer.

The tags are released from the apparatus at predetermined points and these points are fixed by the shape of the head of the tag and by its size. A given shape and size is released at a certain point, each shape and size of tag corresponding to a definite point of release. In effecting by its size and shape the release of the piece from the conveyer at a predetermined point, the tag performs a third function; that of assorting the pieces.

When the pieces are released from the conveyer at the predetermined points, each lot or bundle is found to be collected together in a certain portion of the apparatus from whence the pieces are removed and the tags taken off. The pieces are then ready to be bundled and shipped out.

The tag comprises a flat plate or head 2, formed preferably of metal inert in the various liquids used in laundries. A shank 3 extends from the head, and fastening means for attaching the tag to the articles to be assorted, such as a pin 4, is attached to the shank, one side of which is turned over to provide a lip 6 into which the sharp point of the pin closes.

In order to support the tag in the jaws 7 of the carrier 8 during the first stages of its progress through the assorting mechanism, and in the slot 9 of the receiver 12 and slot 13 of the collector 14 during the last stage, the head 2 of the tag is provided with a lug 16 on both sides rigidly secured to the tag. Preferably the ends of the lugs are knobbed or upset as shown in Fig. 13. If desired, the lug may be left of cylindrical form as shown in Fig. 14 or it may serve as a shaft upon which small rollers 17, Fig. 15, are mounted.

During the middle stage of the tag's progress through the machine it is supported by the contact of the track members 21 and 22 with the shoulders 23 which are formed on each side of the shank 3. The width of these shoulders varies in the tags of any given division as shown by Figs. 2 to 6 inclusive.

It must not be understood that any particular size or proportions of tags are essential in the practice of my invention, but I have found it convenient to make the smallest tag .50" maximum width, the next size .55", the next .60", the next .65" and the largest .70". By arranging slots of corresponding widths between the tracks 21 and 22, the tags drop through at definite places therein. This variation in width is one of the two means which I provide for effecting the automatic assorting of the tags and attached articles. More than five widths of tag may be used if desired, but this is a number giving a convenient size, neither too small nor too large and with sufficient variation between the sizes to make great accuracy of the correlating mechanism unnecessary. A second means of differentiating the tags is provided by the shape of the top portion of the head and I find it convenient to use five different shapes for each width of tag head, thus giving twenty-five different tags which vary from each other in width or shape or both width and shape. The variations in shape are preferably obtained by notches 25 cut in one of the upper corners so that the shape or extent of the tag relative to the horizontal and vertical center lines through the lug 16 is varied. For convenience the group of tags shown in Figs. 2 to 6 inclusive are referred to as tags of the first division. It will be observed that while the units of this division vary in the width of the head, the distances X and Y are constant for the division. I find it convenient to make X equal to .15" and Y equal to .125", but it is to be understood that tags may be made with proportions and dimensions other than those which I have mentioned. The tags or units of the second division differ from those of the first only in the dimension X which is conveniently made .05". Fig. 7 illustrates the shape of the top of the first tag of the second division and the other four tags of this division vary in size as shown in Figs. 3 to 6 inclusive, only differing therefrom in the size of the dimension X. The dimension Y remains the same for all tags in both divisions.

The third, fourth and fifth divisions of tags comprise in the same manner groups of five tags each, the shape of the top of the first tag in each division being shown in Figs. 8, 9 and 10 respectively, and the size varying in the same way as explained for the first and second divisions. The dimension Y remains constant throughout, but with each division the dimension X varies. I find it convenient in the third division to make X equal to .05" on the opposite or right side of the vertical center line; in the fourth division, .15" on the right side of the vertical center line; and in the fifth division, .25" on the right side of the center line.

From the above and from inspection of Figs. 5 to 13 inclusive, it will be clear that while in any given division the tags vary in width, the tags in that division have the same dimension X and that this dimension differs with each division; also, that throughout the five divisions the dimension Y does not vary. These twenty-five tags, having the same dimension Y, constitute the first series of tags and are numbered from 1 to 25 inclusive. It will be understood without detailed explanation that a second series of twenty-five tags which may be numbered from 26 to 50 can be secured by increasing the dimension Y, that is, by lengthening the tag above the horizontal center line and running a new series of notches across the top as in Figs. 11 and 12 which show the shapes of the tops of the first and second tags of the first division of the second series. In the same way a third series of tags numbered from 51 to 75; and a fourth series numbered from 76 to 100 may be made. I find that .0625" is a convenient amount to increase the dimension Y with each series and this increase is indicated in Fig. 11 as the dimension T.

When the tag is loaded into the carrier 8 on the conveyer chain 26 of a single series or twenty-five bundle apparatus, it stays in the carrier until it is released therefrom by a trip 27, the action or non-action of which is determined by the extent of the notch 25. If the notch extends nearly across the tag as in Fig. 2, the conveyer 26 carries the tag past all the trips 27V, 27IV, 27III and 27II, but the last trip to be reached 27I extends out far enough to catch and release the tag from the carrier. Each section of track is divided into assorting divisions with a trip at the entering end of each division. The trip 27I which is reached by the carrier last of all, is at the entering end of the first assorting division; that is, viewing Fig. 1, the carrier 8 travels from left to right and the first assorting division of the track is at the right as indicated on the figure, the second, third and fourth assorting divisions being broken out to reduce the length of the figure.

After its release from the carrier 8, the tag then rides directly on the track 21—22 until the widening slot permits it to drop through into the receiver 12 which allows it to slide down into the collector 14. The tags of the first division, Figs. 2 to 6 inclusive, are all released from the carrier onto the track by the trip 27I which is the last trip on the machine. The second division of tags, of which Fig. 7 shows the first tag, is released by the trip 27II (not shown) which is the second last trip on the machine, and so on for each division; the fifth or last division (in a single series machine) being released by trip 27V which is the first one reached by the tags in their passage through the machine.

With a single section of track as shown in Fig. 1, only the first series of twenty-five tags is used, but I contemplate arranging my apparatus so that the purchaser may, by the insertion into the trackway of a second section ahead of the first section and the use of a second series of tags, increase the capacity of the apparatus to fifty bundles. In the same way a third section may be inserted ahead of the second and a fourth section ahead of the third and a third and fourth ahead of the third and a third and fourth series of tags added so that the capacity of the apparatus may be increased as desired.

In a multiple series apparatus, it will be understood that the tags having the greatest dimension Y, that is, the greatest height above the horizontal center line, are most conveniently disposed of first, the shortest tags being carried to the end of the machine farthest from the loading point before they are tripped out of the carrier onto the track. The tags of the first series are the shortest; the tags of the second series are the dimension T, Fig. 11, higher than those of the first series, and therefore the trips for releasing them from the carrier are spaced higher than the trips for the first series, so that the first series tags will pass under the second series trips without being released. In the same way the third series of tags are 2T higher than the first series; and the fourth series 3T higher, and the trips for these series are spaced at corresponding heights so that no tag of a series can engage the trip for the series of a higher number.

It should also be noted that all the tags of whatever division or series have the same dimension R; that is, the height from the beginning of the shoulder 23 to the horizontal center line of the lugs 16 is the same for all tags.

Preferably the tag is formed with rounded corners so that fabric coming in contact therewith will not be injured.

From the above it will be perfectly obvious that if it is desired to do so, the tags may be made reversible by spacing the notch 25 on both sides of a vertical center line running through the lugs as in Fig. 16, instead of spacing only from one side. In this case the size of the tags might have to be increased a small amount and the difference in the dimension X of the several divisions would be reduced, so that the required number of variations in the notch spacing could be placed on each side of the center line.

The assorting apparatus in which I prefer to use my tag will now be explained briefly. The process of assorting is a two-stage one, first the tags are assorted into divisions by means of a conveyer which drops all the tags of a given division upon a certain portion of track. There are as many portions or divisions of track as there are divisions of tags and the tags of each division are transferred from the conveyer to the track at a point corresponding to that division of tags and at no other point. This transfer point is determined by the shape of the tag. During the second stage the individual tags or units comprising each division are assorted by being propelled along the track which is arranged with a diverging slot so that the different widths of tags fall through the slot at different points. At each of these discharge points means are provided for catching the falling tag and conducting it to a collector.

A track comprising the members 21 and 22 is suitably supported above the floor. The track members are spaced from each other and their inner edges are stepped so as to provide a diverging slot having the center line A—A. A conveyer chain 26 is arranged to travel at a rather slow speed along one side of the track over the member 21. Carriers 8 extending across the slot A—A, are attached to the conveyer chain at suitable intervals. The body of the carrier is provided with a slot 31 sufficiently wide to receive the body of the tag edgewise therein, the entrance to the slot being widened to facilitate the entrance of the tag.

At a point preferably slightly to the side of a vertical plane running through the center line A—A, the top of the carrier 8 is provided with a shallow seat 32 in which the lugs 16 of the tags are adapted to rest. Immediately beyond this seat, the slot is widened into a channel 33 so that the tag including the lugs 16 will pass through it when the tag is pushed off of the seat 32 and falls upon the track 21—22.

A guard plate 34 is placed so that the operator cannot push the tag too far back in the slot 31 and at loading the tag is merely pushed in until it strikes the guard when it will then rest on the slanting top 35 of the carrier jaws 7. The first step in the automatic operation of the apparatus is the placing of the tag in the seat 32 accomplished by the contact of the tag shank 3 with the slanted edge 36 of the track member 22 aided by the sloping top surface of the carrier. If the slant 35 is not alone sufficient to seat the tag as soon as the guard plate 34 is passed, only a touch of the edge 36 is necessary to accomplish it. Fig. 18 shows the tag in the carrier resting in the seat. Preferably the seat 32 is so placed on the carrier that when the tag is resting therein, the shank 3 of the tag almost touches the edge of the track 22 at the narrowest portion D of the groove in the track. Fig. 19 shows the tag after it has been released from the seat 32, resting on the track 21—22 but still in the slot 31 of the carrier 8.

For convenience in reference the track is divided into a loading division, including the space at one end in which the tags are inserted into the carriers; a seating division, in which the tags are all pushed back into the seat 32 in which they hang suspended near the center of the track slot; a rejection division, in which tags wrongly placed in the carriers are released and dropped out of the machine; and one or more assorting sections, according to the capacity of the machine, each assorting section being divided into five assorting divisions.

The track 22 begins at the seating division, leaving the carriers free of access over the entire loading division. At the rejection division the track slot is widened as shown at C, Fig. 1, so that the largest tag will fall through if it is ejected from the carrier at this division. The slot for each assorting division is the same and comprises a subdivision D which is slightly wider than the shank 3 of the tag, but smaller than the head of the smallest tag. The next subdivision E is slightly wider than the head of the smallest size tag; the subdivisions F, G, H and I are each slightly wider than the heads of the second, third, fourth and fifth size of tags respectively. That is, for each tag there is a subdivision of the slot through which that tag and no larger one will pass. At the end of the fifth assorting division, the slot narrows to the first subdivision D of the fourth assorting division. In each assorting division the subdivisions E, F, G, H and I correspond to the sizes of tags shown in Figs. 2, 3, 4, 5 and 6 respectively. As will be clear from the above the conveyer carries the tag to a certain assorting division and drops it upon the track at the beginning of the division, then pushes it along until it reaches the slot subdivision of corresponding size when it drops through.

In order to provide for an extension of the apparatus from twenty-five bundle capacity to fifty bundles or more, each of the track members 21 and 22 are preferably separable between the rejection division and the assorting divisions and the parts at that point joined securely by bolts passing through flanges 38. The first section which carries the driving sprocket 39 for the conveyer chain is always assembled on the extreme end of the apparatus. With the lengthening of the track by the insertion of new sections it is of course necessary to lengthen the conveyer chain to correspond. Except for the position of the trips and the driving sprockets in the first section, all the track sections are the same.

The trips 27 comprise means for releasing the tags from the carriers so that they are transferred or delivered onto the track. The trip is pivotally mounted on a plate 42 which extends outwardly from the track and is placed at such a height that it engages only the extreme upper portion of the tags of the corresponding series. The trip 27 is provided with a pin 43 extending upwardly through the slot 44 in the plate 42 and engaging a spring 45 which tends to keep the trip in the retracted position. A notch 46 is cut in the forward edge of the trip and the trip is so placed laterally of the line of travel of the tags that the edge 47 on the tag (Fig. 5) engages the edge 48 of the trip as the tag is conveyed along by the carrier. The edge 48 of the notch 46 is only sufficient to give certain engagement with the tag and when the tag strikes the trip, the latter is turned on its pivot 49, sweeping the tag out of the seat 32 and over the edge into the channel 33 through which it falls upon the track. The trip then snaps back into normal position. Since the tags of the first division (Figs. 2 to 6 inclusive) are notched out nearly across the entire top, these tags will pass by the first four trips, 27V, 27IV, 27III and 27II, but the last trip reached, 27I, which extends out far enough to engage the edge 47 of the tag, will unseat the tags of the first division from the carrier. The tags of the fifth division (Fig. 10) are notched the least and these tags are tripped from the carrier by the trip 27V which extends toward the center line A—A only far enough to engage the edge 47 of that division.

Since the trips are preferably arranged to act only when the tags are placed in the carriers with the numbered face forward, means are provided for ejecting from the carriers any tag wrongly placed therein. This means preferably comprises a thin plate 51 having a slanting edge 52 secured to the track 22 at such a height that when the tags are properly placed in the carrier, they are carried past the trip 51, which passes through the recess 53 of the tag. If the tag is placed wrongly in the carrier, the side which has no recess strikes the slanting edge 52 and is swept out of the seat 32 and falls through the track out of the machine.

If desired, the tags may be formed symmetrically with respect to the vertical center line as shown in Fig. 16. Such a tag is reversible, and is ejected from the apparatus at the proper point, there being no need for a rejection division or rejection means. However, if the recess 53 is used at all, it is formed in all the tags of whatever series. It may be formed distinct from the notch 25 as in Fig. 8 but it will be found convenient to merge it with the notch 25 as shown in Fig. 7.

Means are provided for receiving the tags when they drop through the slot, and collecting them, together with the attached articles, so that they may be conveniently handled. A receiver 12 is pivotally mounted upon the tracks just below the dropping point in each width of track slot, and is provided with a slot 9 completely dividing the bottom wall 54 of the member and the slot is of such width that a tag passes edgewise easily therethrough, being supported therein by the projecting lugs 16 bearing against the edges adjacent the slot. The bottom wall 54 is sharply inclined so that a tag dropping therein will slide down the slot. Normally the receiver for a given subdivision of slot is held so that a tag first engages it just before reaching the end of the previous slot subdivision. That portion of the bottom wall of the receiver nearest the approaching tag is cut away so that the tag engages only the prong 55, which projects out across the center line of the track slot. The forward travel of the tag along the trackway swings the receiver backward against the resistance of the spring 56 until the receiver slot 9 lies in a plane preferably substantially perpendicular to the center line A—A of the track slot at which point the tag has reached the dropping point. If the tag is not of the size to drop through the track slot at this point, or if the tag is still in the carrier, the receiver swings around with the tag until released therefrom when it snaps back into place. If the tag is on the track and of the size to drop through the slot, it falls and the flanged edge 57 of the projecting prong catches under the lug 16. The tag then slips down the edge 57 into the slot 9 where it is supported by both lugs. The edge 57 of the prong is flanged so that the tag will not slip off of the prong when it drops upon it and the shape of the lug is such that it hooks over this edge. A further influence in this direction is effected by the spring-pressed return movement of the receiver, the instant the tag is released from the track and the carrier.

The receiver is secured to a bracket 58 on the track or frame by a pivotal connection 59 through its top wall. The slot 9 in the bottom wall of the receiver terminates at a point preferably in vertical alinement with the center line of the pivot 59 so that the position of the end of the slot is not changed materially with the swinging of the receiver. The function of the receiver is to catch or receive the tags as they are released from the track and conduct them to the collector 14 which is arranged at an angle to the horizontal below the discharge end of the receiver. The tags sliding down the receiver enter the slot 13 of the collector which is also inclined to the horizontal, and slide therein to the lower end. A catch or stop 61 is provided at the lower end which retains the tags within the collector. The upper end of the slot 13 in the collector is widened out sufficiently to avoid jamming the tags as they discharge from the receiver and the bottom portion of the collector extends under the receiver for a short distance so that a tag discharging from the receiver falls directly upon the collector. The collectors each preferably bear a number corresponding to the number of the tags they are adapted to receive. The collector 14, Fig. 1, receives the second smallest tag of the first division and is therefore given the number 4 since the #4 tags are collected in it.

A basket of the tagged pieces to be assorted is placed convenient to the hand of the operator who sits at the side of the machine at the loading division. The pieces are taken from the basket one at a time and the tags thereon thrust edgewise, and face forward, into the slots 31 of the slowly moving carriers 8 as they pass along the loading division. The operator pushes the tags backward against the guard 34 leaving the attached article hanging below the carrier. The guard terminates with the loading division and on entering the seating division the tag shank is engaged by the angularly disposed edge 36 of the track 22 which slides the tag down the sloping edge 35 until the lugs on the tag rest in the seats 32. The carrier then enters the rejection division where the trip 51 ejects from the carrier any tag not properly placed therein. If properly placed, the carrier conveys the tag into the fifth assorting division. Assume the tag to be No. 4. It will pass each of the trips 27V, 27IV, 27III and 27II of the fifth, fourth, third and second assorting division respectively and will swing each of the receivers in those divisions as it passes by. Since number 4 tag belongs in the first division it is caught by the trip 27I of that division and swept off of its seat on the carrier, and delivered upon the track. It still is held in the slot 31 of the carrier, however, and is therefore still propelled forward, being prevented from twisting out of the substantially vertical plane by its engagement in the carrier slot between the jaws 7 and the projections 62. Sliding upon the track it finally engages the prong 55 of the receiver 12 as it nears the end of the twenty-third subdivision of the track slot which is subdivision E of the first assorting division. As it enters the twenty-fourth subdivision (F) the No. 4 receiver is approximately at right angles to the track, and the tag falling through the track slot is caught, one lug 16 engaging over the flanged edge 51 of the receiver. As the receiver returns to normal position the tag slides downwardly through the slot 9 and drops into the collector 14, sliding downwardly therein into the catch 61 at the lower end of the collector. A tape is then passed about the pendent bundle of pieces and tied or buckled to hold them all together; the catch 61 is slipped back and the bundle drawn out of the collector. Since they are all at one end of the bundle, the tags are easily and quickly removed from the pieces and thrown into a numbered compartment to await further use upon a new bundle.

In Figs. 16 and 17, I have shown a modified form of pin. In this construction the coil 65 is located just above the turn 66 at the bottom. The advantage in this construction lies in the fact that articles secured by the pin hang in a vertical center line through the tag and there is no tendency to tip the tag sidewise in the track. The wire of the pin is bent on each side of the coil at 67 and 68 so that the fabric of the marked article will not catch in the coil 65. By keeping the coil quite close to the turn 66 the resiliency of the pin is not materially affected.

I claim:

1. In combination with an assorting apparatus, a tag attachable to the articles to be assorted, said tag being provided with means for supporting the tag in said apparatus.

2. In combination with an assorting apparatus, a tag attachable to the articles to be assorted and means on said tag adapted to coact with said apparatus to assort said articles.

3. In combination with an assorting apparatus, a tag attachable to the articles to be assorted and provided with means for supporting the tag in said apparatus, and means for identifying said tag arranged thereon.

4. In combination with an assorting apparatus, a tag attachable to the articles to be assorted and provided with means for supporting the tag in said apparatus, and means on said tag adapted to coact with said apparatus for assorting said articles.

5. In combination with an assorting apparatus, a tag attachable to the articles to be assorted and having identification means arranged thereon, and means on said tag adapted to coact with said apparatus to assort said articles.

6. In combination with an assorting apparatus, a tag attachable to the articles to be assorted comprising means for supporting the tag in said apparatus, means adapted to coact with said apparatus to assort said articles, and identifying means.

7. In combination with an assorting apparatus, a tag attachable to the articles to be assorted, and having identifying means thereon, said tag having means adapted to coact by reason of its shape with said apparatus to assort said articles.

8. In combination with an assorting apparatus, a tag attachable to the articles to be assorted and having identifying means thereon, said tag having means adapted to coact by reason of its size with said apparatus to assort said articles.

9. In combination with an assorting apparatus, an assorting tag comprising a flat plate, means for attaching said plate to the articles to be assorted and means adapted to coact with said apparatus for assorting said articles.

10. In combination with an assorting apparatus, an assorting tag comprising a flat plate, means for attaching said plate to the articles to be assorted, means for identifying said plate, and means adapted to coact with said apparatus for assorting said articles.

11. In combination with an assorting apparatus, an assorting tag comprising a flat plate, means for attaching said plate to the articles to be assorted, means for supporting said plate in said apparatus, means for identifying said plate and means adapted to coact with said apparatus for assorting said articles.

12. In a tag of the class described, means for attaching the tag to the articles to be assorted, and a supporting lug disposed on said tag.

13. In a tag of the class described means for attaching the tag to the articles to be assorted, and a supporting lug arranged on said tag, said lug being enlarged at its end.

14. An assorting tag of the class described comprising a notched head, means for attaching said head to the articles to be assorted, and a lug on said head for supporting said tag and attached article.

15. In combination with an assorting apparatus, a tag comprising a flat plate, means for attaching said plate to the articles to be assorted rigidly secured to said plate, and a lug having an enlarged end disposed on said plate.

16. In combination with an assorting apparatus, a tag comprising a flat plate provided with a notch and means for attaching said plate to the articles to be assorted, said notched plate being adapted to coact with said apparatus to assort said articles.

17. In combination with an assorting apparatus, a tag comprising a flat plate provided with a notched edge, means for attaching said plate to the articles to be assorted, and means for identifying said plate arranged thereon.

18. In an assorting system, a tag attachable to the articles to be assorted comprising a head and a pin attached to said head, said pin being formed with a resilient coil the material of the pin at both ends of said coil being turned across said coil.

19. In an assorting system, a tag attachable to the articles to be assorted comprising a head and a pin attached to said head, said pin having a body portion containing a resilient coil and a pointed clasp portion joining said body portion in a smooth turn.

In testimony whereof, I have hereunto set my hand at San Francisco, California, this 22d day of May, 1916.

DONALD H. PARCE.

In presence of—
C. S. EVANS.